United States Patent
Bruening

(10) Patent No.: US 6,914,971 B1
(45) Date of Patent: Jul. 5, 2005

(54) METHOD AND SYSTEM FOR PROVIDING CALLER IDENTIFICATION FOR AN UNIDENTIFIED CALLING PARTY

(75) Inventor: Gregory W. Bruening, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 300 days.

(21) Appl. No.: 09/606,617

(22) Filed: Jun. 29, 2000

(51) Int. Cl.[7] .............................................. H04M 3/42
(52) U.S. Cl. ............................ 379/215.01; 379/88.17; 379/142.08
(58) Field of Search ...................... 379/67.1, 70, 88.01, 379/88.02, 88.13, 88.17, 88.18, 88.19, 88.21, 88.26, 142.06, 142.08, 215.01, 211.01

(56) References Cited

U.S. PATENT DOCUMENTS

| | | | | |
|---|---|---|---|---|
| 5,511,111 A | * | 4/1996 | Serbetcioglu et al. | 379/88.01 |
| 5,796,806 A | * | 8/1998 | Birckbichler | 379/88.02 |
| 5,805,587 A | * | 9/1998 | Norris et al. | 370/352 |
| 5,809,128 A | * | 9/1998 | McMullin | 379/215.01 |
| 5,999,613 A | * | 12/1999 | Nabkel et al. | 379/215.01 |
| 6,038,443 A | * | 3/2000 | Luneau | 455/415 |
| 6,122,347 A | * | 9/2000 | Borland | 379/70 |
| 6,128,379 A | * | 10/2000 | Smyk | 379/230 |
| 6,144,644 A | * | 11/2000 | Bajzath et al. | 370/259 |
| 6,282,275 B1 | * | 8/2001 | Gurbani et al. | 379/142.06 |
| 6,366,661 B1 | * | 4/2002 | Devillier et al. | 379/211.01 |
| 6,377,668 B1 | * | 4/2002 | Smock et al. | 379/142.08 |
| 6,498,841 B2 | * | 12/2002 | Bull et al. | 379/142.08 |

* cited by examiner

*Primary Examiner*—Bing Q. Bui
(74) *Attorney, Agent, or Firm*—Townsend and Townsend and Crew LLP

(57) ABSTRACT

A telecommunication system provides calling party identification for an unidentified calling party while the subscriber is logged on to the Internet on their subscriber line. If a call is made to the subscriber's line while the subscriber is logged onto the internet on the subscriber line, the SCP determines whether the calling party information is present. If the calling party information is not present (either unavailable or blocked), the calling party is prompted to record their name (or some sort of identification). The subscriber can choose to have the recorded identification played on the subscriber's computer via the Internet. After listening to the audible identification on the subscriber's computer, the subscriber then can choose to reject the call, send the call to voicemail, terminate the Internet connection and take the call, etc.

59 Claims, 3 Drawing Sheets

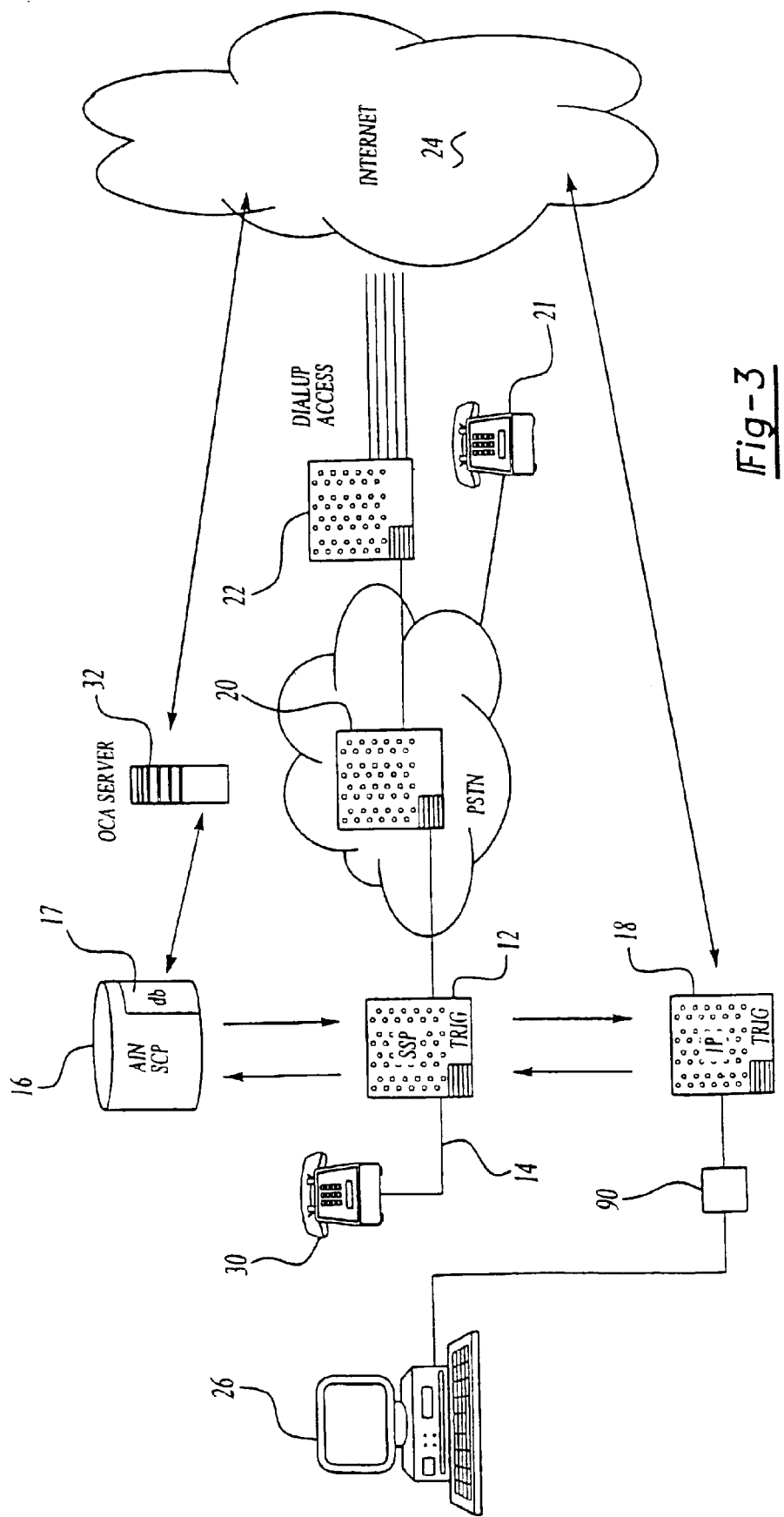

METHOD AND SYSTEM FOR PROVIDING CALLER IDENTIFICATION FOR AN UNIDENTIFIED CALLING PARTY

BACKGROUND OF THE INVENTION

The present invention relates generally to a method and system for providing calling party identification and more particularly to a method and system for providing calling party identification for an unidentified calling party to a subscriber connected to the Internet via their telephone.

Many telephone customers subscribe to caller ID service. Caller ID provides to the subscriber an identification of the calling party. Some calling parties' identity may be unavailable, based upon the location of the calling party or if the calling party selectively blocks the calling party identification. For this case, some telephone customers also subscribe to a feature in which incoming calls which do not include calling party identification (either unavailable or blocked) are first "screened." For screening, the telephone system first prompts the calling party to audibly identify itself to the telephone system. This audible identification is then played to the subscriber, who can then decide to accept or reject the call.

Caller ID can also be provided to a telephone subscriber logged onto the Internet via the subscriber's line: If a new call is made to the subscriber's line while connected to the Internet, the subscriber sees a "pop-up" screen on their computer display informing them of the new call and presenting several options for disposal of the call. These dispositions include: taking the call over the Internet, sending the call to the subscriber's voicemail, rejecting the call, and hanging up the Internet connection and accepting the call over the phone. This feature works well when the identity of the calling party is known; however, when the calling party identity is unknown (e.g., the calling party information is unavailable or blocked), the information presented to the subscriber is simply "unknown call." The subscriber does not have enough information to determine whether to accept or reject the call. Even if the subscriber subscribes to both the caller ID and audible identification feature, the pop-up screen for a call with no calling party information would simply show that the calling party identification is not available. The audible identification cannot be provided to the subscriber.

SUMMARY OF THE INVENTION

The present invention requests from the calling party and provides to the subscriber an audible identification of the calling party. Generally, while the subscriber is logged on to the Internet, another call to the subscriber's line causes the service switching point ("SSP") to send a query to a service control point ("SCP"). The SCP screens the calls and determines whether the calling party information is present. If the calling party information is not present (either unavailable or blocked), the SCP directs the SSP to send the call to an intelligent peripheral ("IP"). The IP prompts the calling party to record their name (or some sort of identification). A pop-up screen appears on the subscriber's display alerting the subscriber of an incoming call. The pop-up screen indicates that the calling party identification is unavailable, but the subscriber also has the additional option of "playing the recorded identification." The subscriber selects the option to have the recorded identification played on the subscriber's computer via the Internet. After listening to the audible identification on the subscriber's computer, the subscriber then can choose to reject the call, send the call to voicemail, terminate the Internet connection and take the call, etc.

In another embodiment, the user can be connected to the Internet (or any other computer network) via some route other than the subscriber line to which the incoming call is made. For example, the user can be connected to the computer network via a second subscriber line, a DSL line, cable modem, etc. In this case, calls to the subscriber line are handled in the same way described above, except that the subscriber line need not be busy—the user has chosen to have all calls to the subscriber line screened and to be notified via the computer network.

BRIEF DESCRIPTION OF THE DRAWINGS

FIG. 3 is a schematic of an alternate embodiment of the caller identification system of FIG. 1, also implemented in an advanced intelligent network.

DETAILED DESCRIPTION OF A PREFERRED EMBODIMENT

Figure 1:
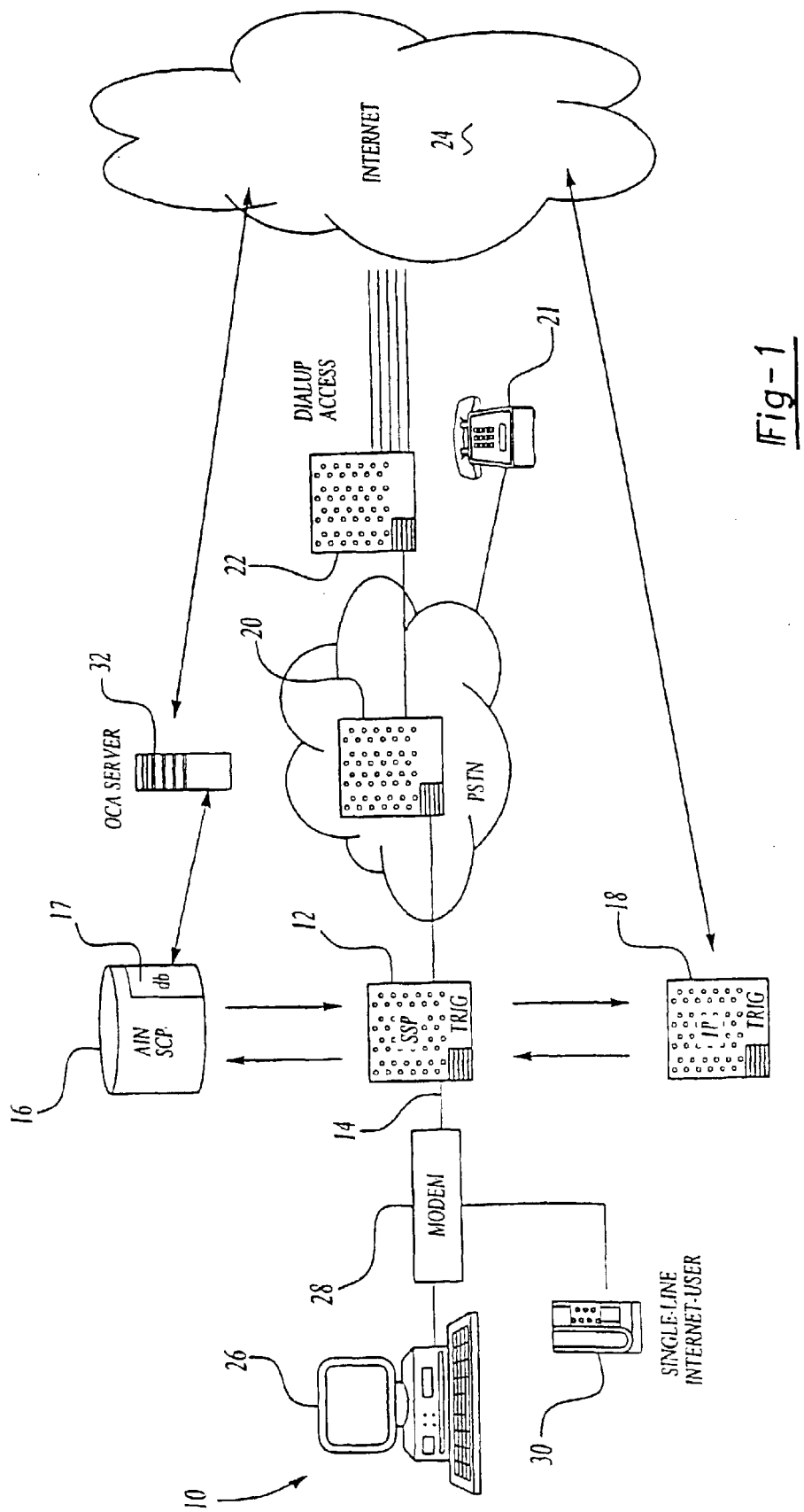
FIG. 1 is a schematic of the caller identification system of the present invention as implemented in an advanced intelligent network.

FIG. 1 schematically illustrates a telecommunication system 10 according to the present invention that provides caller identification for an unidentified calling party to a subscriber connected to the Internet via their phone. The telecommunication system 10 is shown implemented in an advanced intelligent network ("AIN") and includes several known programmable components which are additionally programmed to perform the functions described below.

The telecommunication system 10 includes a service switching point ("SSP") 12 connected to a plurality of subscriber lines, including subscriber line 14. As is well known to those familiar with AIN, the SSP 12 is an intelligent switch programmed to recognize a variety of triggers relating to subscriber line 14. In response to these triggers, the SSP 12 sends a query to a service control point ("SCP") 16. Generally, the SCP 16, upon receiving a query from the SSP 12, indexes its database 17 to determine how the call should be processed and returns instructions regarding call routing or processing to the SSP 12.

The SSP 12 is also connected to an intelligent peripheral ("IP") 18, another known AIN component. The SSP 12 also provides a connection of the subscriber line 14 to a telephone network 20, providing access to and from other subscriber lines, such as subscriber line 21. The subscriber line 14 is also provided access through the telephone network 20 and dial-up access 22 to the Internet 24 (or some other computer network). In order to access the Internet 24, the user has a computer 26 connected by a modem 28 to the subscriber line 14, which is shared with a telephone 30.

An on-line call alert ("OCA") server 32 communicates with the SCP 16 and the Internet 24. The OCA server 32 includes information necessary for the OCA server 32 to communicate with the subscriber's computer 26 via the Internet 24 (such as an email address, the subscriber's Internet service provider or dial-up access 22, etc.) The IP 18 also includes this information sufficient for it to communicate with the subscriber's computer 26 via the Internet 24.

Each of the above components described in reference to FIG. 1 is generally known and unless otherwise specified performs the functions it performed in previously known AIN and/or online call alert systems. The above components are additionally programmed to perform the functions described above as well as those described with respect to the flow chart in FIG. 2. Programming each of the components to perform the functions described herein is within the skill of one of ordinary skill in the art based upon this description.

Figure 2:
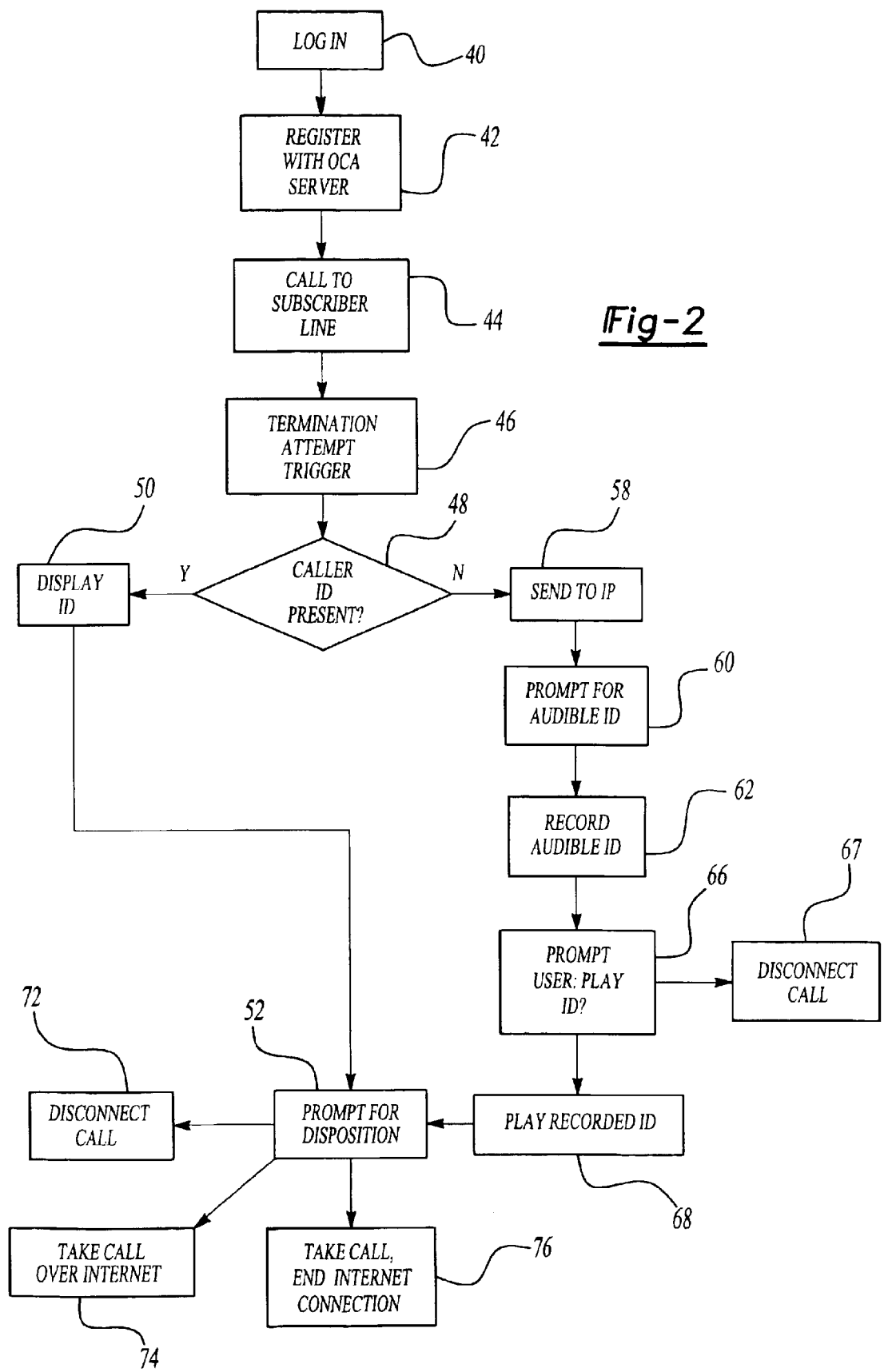
FIG. 2 is a flowchart illustrating the operation of the caller identification system of FIG. 1.

In step 40 of FIG. 2, the subscriber logs onto the Internet 24 with their computer 26 via the modem 28 and subscriber line 14 (as well as SSP 12, telephone network 20 and dial-up access 22). In step 42, the OCA server 32 is notified via the Internet 24 that the user is logged on to the Internet 24 on the subscriber line 14. In step 44, while the subscriber is logged on to the Internet 24, a call is attempted from another subscriber line 21 to subscriber line 14. This results in a termination attempt trigger in step 46 at SSP 12, which causes SSP 12 to send a query to the SCP 16.

In step 48, the SCP 16 screens the call and determines whether the calling party information is present. If the calling party information is available and not blocked (or, if blocked, unblocked after prompting), then the call is allowed to proceed with an on-line caller alert in step 50, in which the user is informed of the calling party's identification and prompted to choose an option for disposition of the call in step 52. This prompt may be sent via the Internet 24 to the user's computer 26 as a screen pop-up. This will be described in more detail below.

In the present invention, if after step 48 the calling party information is not available, the SCP 16 directs the SSP 12 to send the call to the IP 18 in step 58. In step 60, the IP 18 prompts the calling party on subscriber line 21 to give an audible identification of the calling party, which is recorded on the IP 18 in step 62.

Alternatively, the user can elect to require the audible identification for every call, whether caller identification is available or not. If the user so elects, then both branches to steps 50 and 58 would always both be followed after step 48.

In step 66, the SCP 16 instructs the OCA server 32 to communicate with the subscriber's computer 26 via the Internet 24 to present a pop-up screen on the computer alerting the subscriber of an incoming call. The pop-up screen indicates that calling party identification is unavailable, but that the user has the option of "play the recorded identification." At this point, the user can select to disconnect the call in step 67. Alternatively, the user can choose to play the recorded auto identification in step 68. Upon the user's selection of the "play the recorded identification" option, the user's computer 26 communicates this option to the OCA server 32 via the Internet 24. The OCA server 32, in turn, passes this request to the SCP 16. The SCP 16 then instructs the IP 18 to connect to the subscriber's computer 26 via the Internet 24. Using various Internet protocols such as H.323, the IP 18 sends the recorded audible caller identification to the subscriber's computer 26. The subscriber's computer 26 plays the incoming recording on the computer speakers or other appropriate hardware (e.g., headset).

After listening to the recorded audible identification of the calling party in step 68, the user is then presented with the disposition options on the user's computer 26 in step 52. In step 52, the user can choose to disconnect the call in step 72, take the call over the Internet in step 74, take the call on subscriber line 14 and disconnect the Internet connection in step 76 or some other disposition of the call.

FIG. 3 illustrates an alternate configuration for implementing the present invention. Most of the same components of the system of FIG. 1 are utilized in FIG. 1, and except as otherwise described or implied, these components have the same functionality. In FIG. 3, the user's computer 26 is connected to the Internet 24 via an alternate route 90, such as DSL, cable modem or a second subscriber line. Since the user is not tying up the subscriber line 14 for Internet 24 access, this invention would most likely only be useful in this configuration if the user elects to have caller identification for all calls to subscriber line 14 routed via the Internet 24 to the user's computer 26, whether subscriber line 14 is busy or not.

The AIN architecture is well-documented and well-known to those skilled in the art and, except as otherwise described above, the operation of the AIN components shown in FIG. 1 is in accordance with published standards. Further, the references in the above description to these known AIN components are to be considered terms of art, which would implicitly require their known functionality.

In accordance with the provisions of the patent statutes and jurisprudence, exemplary configurations described above are considered to represent a preferred embodiment of the invention.>However, it should be noted that the invention can be practiced otherwise than as specifically illustrated and described without departing from its spirit or scope. For example, the subscriber could communicate with the OCA server 32 when selecting the playback option in step 68. The OCA server 32 could communicate directly with the IP 18 and instruct it to play back the recorded audible identification in step 68. Alternatively, the OCA server 32 could obtain the recorded audible identification from the IP 18 and then play it back to the subscriber computer 26 in step 68 via a protocol such as H.323. Another alternative would be to combine the functionality of the IP 18 and the OCA server 32 into the same logical box. Additionally, it should be recognized that any one of several other triggers could be used for this feature, such as a 3/6/10 digit trigger (podp), terminating busy, or terminating no-answer. As is also known, the "computer" 26 described above could be a fully-functional, fully-programmable general purpose "computer" or what may more commonly be referred to as an "internet appliance" capable of receiving and playing the audible identification.

Alphanumeric labels on method steps in the claims below are for convenience of reference by dependent claims, and do not signify a required order of performance of the method steps.

What is claimed is:

1. A method for identifying a caller, the method comprising:
    a) receiving, in an advanced intelligent network (AIN), a call to a subscriber line having a device connected to a computer network;
    b) determining that the subscriber line is connected to the computer network;
    c) in response to said step b), prompting the caller to provide identification;
    d) receiving, at the AIN, an audible identification from the caller; and
    e) providing the audible identification via the computer network and the subscriber line to the device.

2. The method of claim 1 further including the step of recording the audible identification in said step d).

3. The method of claim 1 further including the step of sending the recording of the audible identification via the subscriber line in said step e).

4. The method of claim 1 further including the steps of:
   f) before said step c), determining whether calling party information is present in response to said step b);
   g) determining that the calling party information is not present; and
   h) performing said step c) in response to said step g).

5. The method of claim 4 further including the steps of:
   i) detecting a trigger at the subscriber line in said step a);
   j) performing said step f) in response to said step i).

6. The method of claim 5 further including the step of directing the call to an intelligent peripheral based upon said step g).

7. The method of claim 1 further including the step of displaying a plurality of disposition options for the call via the subscriber line.

8. A method as recited in claim 1, the method further comprising:
   f) allowing a user of the subscriber line to choose to take the call over the computer network or via the subscriber line.

9. In an advanced intelligent network (AIN), a communication network comprising:
   a service switching point (SSP) in communication with a subscriber line and generating a query in response to an attempted call by a third party to the subscriber line;
   a service control point (SCP) receiving the query from the SSP, and in response to the query, generating a signal indicating how to process the attempted call; and
   a programmable network computer in the AIN configured to receive the signal from the SCP, request an audible identification from the third party, and send the audible identification to a user computer connected to the subscriber line via a computer network.

10. The communication network of claim 9 wherein the programmable network computer records the audible identification.

11. The communication network of claim 9 wherein the programmable network computer comprises an online call alert (OCA) server communicating with the SCP, the OCA server including information associating the subscriber line with an address on the computer network, and wherein the programmable network computer sends the audible identification to the address associated with the subscriber line.

12. The communication network of claim 9 wherein the programmable network computer is an intelligent peripheral (IP) sending the audible identification via the computer network to the subscriber line.

13. The communication network of claim 9 wherein the subscriber line is connected to the computer network and the audible identification is sent via the computer network to the subscriber line.

14. The communication network of claim 9 wherein the programmable network computer comprises an intelligent peripheral (IP), the IP including information associating the subscriber line with an address on the computer network, and wherein the IP sends the audible identification to the address associated with the subscriber line.

15. The communication network of claim 9 wherein the programmable network computer comprises an online call alert (OCA) server communicating with the SCP, the OCA server including information associating the subscriber line with an address on the computer network, and wherein the OCA server sends the audible identification to the address associated with the subscriber line.

16. A system as recited in claim 9, wherein the programmable network computer is further configured to allow a user of the subscriber line to choose to take the call over the computer network or via the subscriber line.

17. In an advanced intelligent network (AIN), a communication network computer programmed to receive an audible identification from an originating subscriber line attempting a call to a terminating subscriber line and play the audible identification to the terminating subscriber line via a computer network.

18. The communication network computer of claim 17 wherein the communication network computer requests the audible identification on the originating subscriber line.

19. The communication network computer of claim 17 wherein the communication network computer records the audible identification.

20. The communication network computer of claim 17 wherein the communication network computer comprises an online call alert (OCA) server communicating with a service control point (SCP), the OCA server including information associating the subscriber line with an address on the computer network, and wherein the communication network computer sends the audible identification to the address associated with the subscriber line.

21. The communication network computer of claim 17 wherein the communication network computer is an intelligent peripheral sending the audible identification via the computer network to the terminating subscriber line.

22. The communication network computer of claim 17 wherein the subscriber line is connected to the computer network and the audible identification is sent via the computer network to the subscriber line.

23. In an advanced intelligent network (AIN), a method for identifying a caller including the steps of:
   a) detecting an attempted call to a subscriber line;
   b) in response to said step a), prompting the caller to provide an audible identification;
   c) receiving the audible identification from the caller; and
   d) providing the audible identification via a computer network and the subscriber line.

24. The method of claim 23 wherein the computer network is the Internet.

25. A method as recited in claim 23, the method further comprising:
   e) allowing a user of the subscriber line to choose to take the call over the computer network or via the subscriber line.

26. In an advanced intelligent network (AIN), a method for identifying a caller, the method comprising:
   a) receiving a third party call to a subscriber line including a user computer connected thereto;
   b) prompting a third party caller to provide identification;
   c) receiving an audible identification from the third party caller, wherein the audible identification is provided via the subscriber line and a computer network to the user computer; and
   d) providing a visual interface to the user computer via the computer network and the subscriber line to notify a user of the third party call.

27. The method of claim 26 wherein the computer network is the Internet.

28. The method of claim 26 wherein the visual interface comprises an Internet web page.

29. The method of claim 26 wherein the visual interface comprises a pop-up screen.

30. The method of claim 26 wherein the visual interface includes an option of playing the audible identification of the third party caller and an option of disconnecting the third party call.

31. The method of claim 30 wherein if the user selects the option of playing the audible identification of the third party caller.

32. The method of claim 26 wherein providing the audible identification further comprises recording the third party caller audible identification and sending the recording of the audible identification via the computer network and the subscriber line.

33. The method of claim 30 wherein the programmable network computer records the audible identification.

34. The method of claim 26 further comprising using a service control point (SCP) to instruct an online call alert (OCA) server to provide the visual interface to the user computer via the computer network.

35. A method as recited in claim 26, the method further comprising:
   e) allowing the user to choose to take the call over the computer network or via the subscriber line.

36. In an advanced intelligent network (AIN), a system for identifying a caller, the system comprising:
   a service switching point (SSP) in communication with a subscriber line and configured to generate a query in response to an attempted call by a third party to the subscriber line;
   a service control point (SCP) configured to receive the query from the SSP, and in response to the query, generate a signal indicating how to process the third party call; and
   a programmable network computer in the AIN configured to:
   receive the signal from the SCP;
   request an audible identification from the third party, wherein the audible identification is provided via the subscriber line and a computer network; and
   send a visual interface to the subscriber line via the computer network indicating the third party caller, the visual interface including options for handling the third party call.

37. The system of claim 36 wherein the programmable network computer sends a notification message to the user computer via the visual interface.

38. The system of claim 36 wherein the visual interface comprises an Internet web page.

39. The system of claim 36 wherein the visual interface comprises a pop-up screen.

40. The system of claim 36 wherein the visual interface indicates that the third party caller identification is unavailable.

41. The system of claim 36 wherein the visual interface includes an option of playing the audible identification of the third party caller and an option of disconnecting the third party call.

42. The system of claim 41, wherein if a user selects the option of playing the audible identification of the third party caller.

43. The system of claim 36 wherein the programmable network computer records the third party caller audible identification.

44. The system of claim 43 wherein the programmable network computer sends the recording of the audible identification via the computer network and the subscriber line.

45. The system of claim 36 wherein the programmable network computer comprises an OCA server communicating with the SCP, the OCA server including information associating the subscriber line with an address on the computer network, and wherein the programmable network computer sends the audible identification to the address associated with the subscriber line.

46. The system of claim 36 wherein the programmable network computer comprises an intelligent peripheral (IP), the IP including information associating the subscriber line with an address on the computer network, and wherein the IP sends the audible identification to the address associated with the subscriber line.

47. A system as recited in claim 36, wherein the programmable network computer is further configured to allow a user of the subscriber line to choose to take the call over the computer network or via the subscriber line.

48. A method for identifying a caller through a computer network, the method comprising:
   receiving, at an advanced intelligent network (AIN), a call from a third party to a first subscriber line;
   determining, at the AIN, the identity of the third party placing the call to the first subscriber line; and
   notifying a user of the call from the third party by sending a message to a user computer connected to the computer network via a second subscriber line, wherein an audible identification of the caller is provided via the second subscriber line and the computer network.

49. The method of claim 48, the method further comprising recording the message from the third party placing the call.

50. The method of claim 48, the method further comprising sending the recording of the message to the user computer connected to the computer network via the second subscriber line.

51. The method of claim 48, the method further comprising sending a visual notification of the message to the user computer connected to the computer network via the second subscriber line.

52. The method of claim 48 wherein the second subscriber line comprises a DSL line.

53. The method of claim 48 wherein the second subscriber line comprises a cable modem.

54. The method of claim 48 wherein the second subscriber line comprises a telephone line.

55. A method as recited in claim 48, the method further comprising:
   e) allowing the user to choose to take the call over the computer network or via the first subscriber line.

56. A method for identifying a caller, the method comprising:
   a) receiving a call to a subscriber line having a device connected to a computer network;
   b) determining that the subscriber line is connected to the computer network;
   c) in response to said step b), prompting the caller to provide identification;
   d) receiving an audible identification from the caller;
   e) providing the audible identification via the computer network and the subscriber line to the device; and
   f) allowing a user of the subscriber line to choose to take the call over the computer network or via the subscriber line.

57. A communication network comprising:
   a service switching point (SSP) in communication with a subscriber line and configured to generate a query in response to an attempted call by a third party to the subscriber line;
   a service control point (SCP) configured to receive the query from the SSP, and in response to the query, generate a signal indicating how to process the attempted call; and a programmable network computer configured to receive the signal from the SCP, request an audible identification from the third party, send the audible identification to a user computer connected to the subscriber line via a computer network and the subscriber line, and allow a user to choose to take the call over the computer network or via the subscriber line.

58. A communication network computer programmed to receive an audible identification from an originating subscriber line attempting a call to a terminating subscriber line, play the audible identification to the terminating subscriber line via a computer network and the terminating subscriber line, and allow a user to choose to take the call over the computer network or via the subscriber line.

59. A system for identifying a caller, the system comprising:

a service switching point (SSP) in communication with a subscriber line and configured to generate a query in response to an attempted call by a third party to the subscriber line;

a service control point (SCP) configured to receive the query from the SSP, and in response to the query, generate a signal indicating how to process the third party call; and a programmable network computer configured to:

receive the signal from the SCP;

request an audible identification from the third party, wherein the audible identification is provided via the subscriber line and a computer network to a user;

send a visual interface to the subscriber line via the computer network indicating the third party caller, the visual interface including options for handling the third party call; and allow the user to choose to take the call over the computer network or via the subscriber line.

* * * * *